March 30, 1943.  V. W. BREITENSTEIN  2,315,045
METAL DETECTION DEVICES
Filed Oct. 9, 1939   2 Sheets-Sheet 1

Inventor
Victor W. Breitenstein
By Williams, Bradbury,
McCaleb & Hinkle.
Attys.

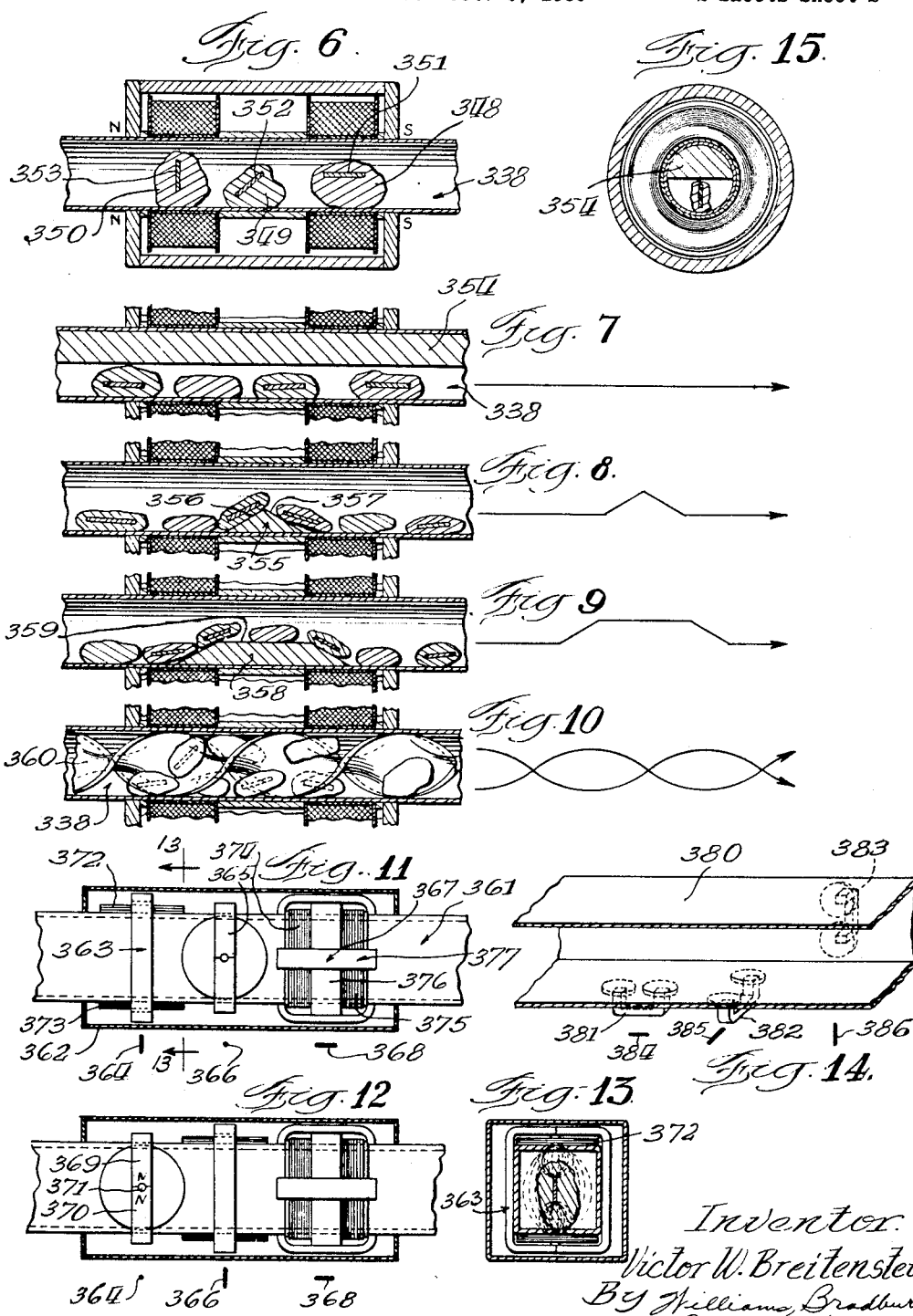

Patented Mar. 30, 1943

2,315,045

UNITED STATES PATENT OFFICE 2,315,045

METAL DETECTION DEVICE

Victor W. Breitenstein, Chicago, Ill., assignor to Illinois Testing Laboratories, Inc., Chicago, Ill., a corporation of Illinois Application October 9, 1939, Serial No. 298,728

4 Claims. (Cl. 177—311)

The present invention relates to metal detection devices, and while it is particularly concerned with devices for detecting the movement, and therefore the presence, of weapons, such as guns, knives, or the like, in banks, penal institutions, etc., and tools, such as files, saws, etc. in industrial establishments or penal institutions, the devices described herein have many industrial applications, and may be used for detecting the movement and therefore the presence of magnetic metal under many different conditions.

Other uses of the metal detection devices will be described in detail as the description of specific examples of the invention progresses.

One of the objects of the invention is the provision of an improved metal detection system which is characterized by its low power consumption and by the fact that no energy is needed for the energization of the coil system, and therefore is no heating of the coils.

This application is a continuation-in-part of my prior application, Serial No. 118,815, filed January 2, 1937, for Metal detection devices, which has resulted in the issuance of U. S. Patent No. 2,179,240, issued November 7, 1939.

Another object of the invention is the provision of a metal detection system in which the system is balanced against the effects of stray field disturbances, and in which the field of detection may be localized.

Another object of the invention is the provision of an improved metal detection system which is unaffected by the presence of metals which are not in motion, thereby preventing disturbance of the system by the mere proximity of magnetic or other metals not in motion and not carried by the person or article under detection.

Another object is the provision of an improved metal detection system in which there are no currents or voltages to be balanced, and therefore no need for constant readjustment to effect this balance, as is frequently necessary in the devices of the prior art.

Another object is the provision of an improved metal detection system which is characterized by a stationary balance of its electrical characteristics rather than by the dynamic balance of the voltages or currents or forces impressed on the system.

Another object is the provision of improved forms of metal detection devices capable of supplying the metal detection impulse for numerous forms of industrial applications.

Another object of the invention is the provision of a plurality of metal detectors adapted to be used for the detection of metal in small units, such as candies, foods, or other materials, adapted to be passed through a conduit.

Another object of the invention is the provision of a plurality of improved modifications of such conduit detectors, by means of which what might be called blind spots, or positions of the metal to be detected, are eliminated and the devices are enabled to detect and produce a satisfactory signal to show the indication of small quantities of metal of practically any size and position.

Other objects and advantages of the invention will be apparent from the following description and the accompanying drawings, in which similar characters of reference indicate similar parts throughout the several views.

Referring to the drawings:

Fig. 6 is a fragmentary sectional view similar to Fig. 3, showing various pieces of flat metal in the course of passing through the conduit, disposed in certain positions, which give maximum, minimum, and intermediate indications, for the purpose of illustrating the reasons for the modifications which follow;

Fig. 7 is a fragmentary sectional view similar to Fig. 6 of a modification in which the articles are caused to pass through the conduit in an eccentric position, to give a better indiction;

Fig. 8 is another fragmentary sectional view of a modification in which the metal to be detected is displaced laterally and rotatively in the course of its movement through the conduit, to give a better detection;

Fig. 9 is another similar view of a modification in which such lateral and angular displacements are made in the metal to be detected at a greater interval of time between the displacements, for the purpose of giving a better indication;

Fig. 10 is a similar fragmentary view in which the articles passing through the conduit are given a rotative and twisting movement as they pass through the conduit, to give a better indication of the presence of the metal;

Fig. 11 is a sectional view, taken on the axis of a tubular conduit, with the conduit and the magnets and coils shown in elevation;

Fig. 12 is a view similar to Fig. 11, taken on a plane at right angles to the plane of Fig. 11;

Fig. 13 is a sectional view, taken on the plane of the line 13—13 of Fig. 11;

Fig. 14 is a fragmentary diagrammatic view, showing the application of magnets and coils in three different positions to a single conduit, for the purpose of detecting with a maximum signal the metal particles of various unfavorable dimensions and in various unfavorable positions.

Fig. 15 is a sectional view taken on a plane at right angles to the axis of Fig. 7.

Figure 1:
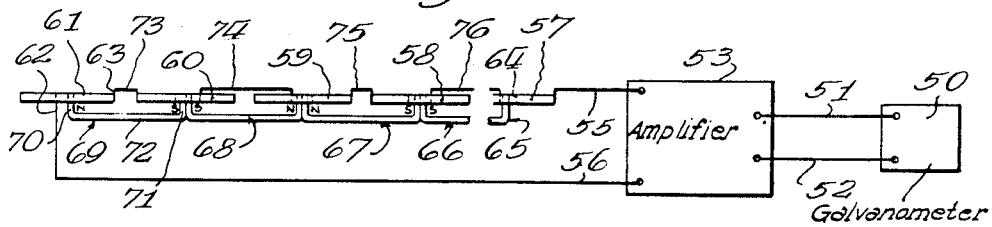
Fig. 1 is a diagrammatic illustration of the coils of the metal detector constructed according to the invention, with the wiring diagram of the detecting circuit.

Referring to Fig. 1, this is a wiring diagram of a circuit to be used with a metal detector of the type described herein.

In the diagram, 50 indicates an electrical indicator which may be a bell, a light, a galvanometer, or any two or all three of these indicators. The conductors 51, 52 lead to the indicator 50 from the output of the amplifier 53, which may consist of any suitable electronic amplifier for amplifying the relatively weak signals or electrical impulses produced as a result of the movement of the metal, and producing an electrical voltage and current in the device 50 sufficient to produce the indication desired.

In other embodiments of the invention the amplifier may be wholly omitted and a galvanometer 53 may be used, with or without any other indicators, visual or audible. In such case, the resistance of the coils of the metal detector is preferably suitably matched with respect to the internal resistance of the galvanometer coil, and the galvanometer or electrical instrument movement used is preferably an under-damped moving coil movement of the lightest weight possible to reduce inertia and to secure the greatest indication, by means of a throw of the needle when metal is to be detected. By way of matching the resistance, it may be cited as an example that if the instrument coil resistance is approximately 7 ohms, the external resistance or that of the coils of the detector may be approximately 35 ohms.

The amplifiers, circuits, and indicators used may correspond substantially to that shown in the patent of John D. Lowry, No. 1,861,929, issued June 7, 1932, for Control apparatus, or the amplifier may be like that disclosed in my prior application, Ser. No. 283,335, Amplifying and detecting systems, filed July 8, 1939.

The input leads 55, 56 from the amplifier of Fig. 1, are connected to the coils 57–61. The coils 57–61 are without any energization and are preferably similar in their winding, resistance, inductance, and capacity; that is, in their electrical characteristics. Thus, each coil will have a lead 62 from the innermost turn and a lead 63 from the outermost turn. These leads are preferably connected in series and in such a manner that the effects produced in the coils counterbalance each other for each magnet.

Figure 2:
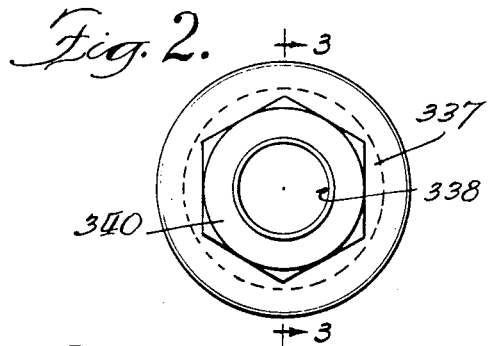
Fig. 2 is an end elevational view of a modified form of metal detector of the conduit type, used for detecting the presence of magnetic metal in small articles that can be passed through the conduit.
Figure 3:
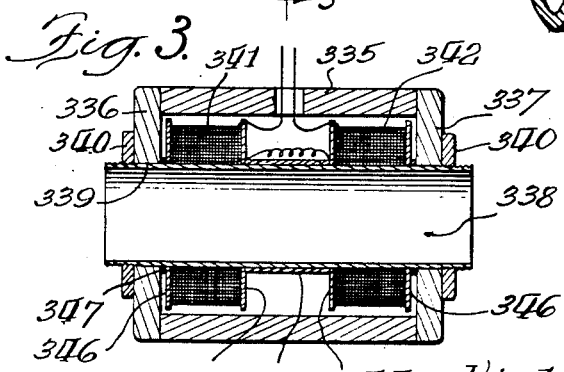
Fig. 3 is an axial sectional view taken on the plane of the line 3—3 of Fig. 2.

Referring to Figs. 2 and 3, these show the structure of a detector unit which may be used with the indicating devices and/or amplifiers mentioned with respect to Fig. 1. This indicating unit includes a tubular metal member 335, preferably of substantially cylindrical shape, and constructed of a special magnetic metal called "Alnico."

The ends of the tube 335 are ground to fit accurately against a similar ground surface around the two soft iron discs 336 and 337, which are of sufficient size to fit on the end of the "Alnico" tube 335. The "Alnico" tubular member 335 is magnetized, and is a permanent magnet, and the thickness of the discs 336, 337 is sufficient to conduct the flux from the permanent magnet 335.

The discs 336, 337 are mounted upon a brass tube 338, by providing the discs with a centrally located aperture 339 for receiving the brass tube 338. The tube is threaded at each end, and the discs 336, 337 may be clamped together against the permanent magnet 335 by a pair of nuts 340, 341.

The brass tube 338 supports a pair of insulated wire coils 341, 342, which are wound in substantially the same way, with the same number of turns of wire of the same size so that these coils are substantially identical in construction and electrical characteristics.

The coils are oppositely connected so as to balance out any stray electrical effects, as previously described, and leads from the coils are brought out through an aperture in the housing formed by the members 335–337.

A fiber tube 343 may space the fiber coil forms 344, 345, comprising fiber discs, and the coils may also be held in place by additional fiber discs 346 at the outer end of each coil, these discs being spaced from the end of the housing by a washer 347.

This metal detecting unit is adapted to be used as a conduit for passing various small articles in which it is desired to detect the presence of magnetic metal.

About 90 percent or more of the troubles encountered in various industries, such as candy manufacture and others, is caused by the presence of iron particles. The permanent magnet of this unit induces a substantially uniform field of considerable strength inside the brass tube 338, and any distortion of this field, caused by the passage of any iron or other magnetic particles, causes a cutting of the conductors of the coils 341, 342 by lines of flux, which induces an electromotive force that is indicated in the ways previously described.

One of the important advantages of the tubular magnetic structure is that it serves at the same time as a shield for shielding the field which it produces in the tube 338 against outside magnetic effects, and provides a very sensitive unit, due to the high flux density that is produced by the "Alnico" magnet.

Referring to Fig. 6, this is an illustration showing various particles 348, 349, and 350 of material passing through the tube 338 for the purpose of detecting the presence of the bodies of metal 351 and 353.

The body of metal in each case happens to be a flat piece of metal which is relatively thin in one dimension and relatively wide in the other dimension. It is, of course, small enough in the third dimension, not shown, to pass through the tube 338. The articles 348—350 might, for example, be pieces of candy. The magnetic metal particle 351 is in a position in which it gives a maximum signal because of the fact that one of its longer dimensions extends longitudinally of the tube in the direction of the flux, and the iron particle 351 tends to attract and conduct the flux more than it would in any other position.

The position of the iron particle 353 in the member 350 is one which gives a minimum indication on the meter because of the closeness of one pole in this particle 353 to the other pole.

The iron particle 352 would give an intermediate indication, and the purpose of the following modifications, Figs. 7–15, is to compel the transit of the metal particles in such manner as to give a better indication of the presence of the metal.

Referring to Fig. 7 and Fig. 15, this is a modification in which a part of the tubular member 338 is blocked off or filled by a non-magnetic body, such as an insulating member 354, which fills up half the tube.

In this case the magnetic particles will have to be located eccentrically of the center of the tube 338, as they pass through, and they will, therefore, give a better indication of the presence of the metal than they would if the particle happened to pass through the exact center of the tube.

The arrow at the right illustrates the direction of movement of the iron particles in the tube.

Referring to Fig. 8, in this case the tube 338 is provided with an obstacle 355, having two sloping sides 356 and 357, which cause the iron particles to have a lateral displacement, and an angular tilting, as they rise over the sloping surface 356, and again as they pass downwardly over the sloping surface 357. The direction of movement of the iron particles is shown again by the arrow at the right.

Referring to Fig. 9, in this embodiment the obstruction 358 has the same slanting surfaces and a horizontal surface 359. The result is that the lateral and angular displacement of the iron particles in this case takes place at points which are closer to the center of the respective coils and at a greater time interval from each other as the iron particles pass through the tube.

Referring to Fig. 10, this is an embodiment in which the tube 338 has been provided with a twisted partition 360, which causes the particles to take the path of one or the other of two screw-threaded conduits through the tube. This gives the particles of iron a twisting movement and results not only in lateral and angular displacement, but the particles may tumble over and over as they pass through the tube.

Referring to Fig. 11, this is a modification in which the non-magnetic tubular member 361 is provided with three sets of magnets and coils adapted to produce maximum effects in three different positions of the iron particles. The magnets and coils are all housed by a tubular housing 362, and each of the three arrangements is particularly adapted to give a maximum indication for flat or thin iron particles in one position. For example, the magnet-coil assembly at 363 gives a maximum indication for thin pieces of metal which pass through the tube in substantially the position shown diagrammatically at 364, below the housing 362.

The magnet-coil assembly at 365 gives a maximum indication when the particle of metal has its smallest dimension extending outward, arranged as shown at 366, below Fig. 11. By reference to Fig. 12, which is a view taken at right angles to Fig. 11, it will be seen that in Fig. 12 the particle 366 extends vertically in the view. The magnet-coil assembly shown at 367 in Figs. 11 and 12 give a maximum indication for the presence of magnetic metal when the thin particle of metal assumes a position as shown at 368 in Figs. 11 and 12, that is, an axial position.

The assembly 363 may be made of a pair of permanent magnets 369, 370, having like poles, such as the north poles, adjacent each other at the pole piece 371, which is located at the center of the flat pancake coil 372 or 373.

The magnet-coil assembly 365 is identical in structure to that of 363, but is displaced about the periphery of the tube by 90 degrees. The magnet-coil assembly 367 includes a pair of insulated wire coils 374, 375, wrapped around the tube 361, and held in place by a spacer 376.

A plurality of permanent magnets 377 are arranged with the legs embracing these coils 374, 375, and the ends of the legs engaging the tube 361. The magnets 377 are preferably arranged at equally spaced points about the tube 361, and are fixedly secured in place, as they are also in every other embodiment of the invention.

Fig. 13 is an illustration showing the position of the lines of force at the section 13 of Fig. 11 when an iron particle in the position 364 passes through that part of the tube.

Since the assembly of Figs. 11–13 is provided with three different magnet-coil structures, each of which is adapted to take care of one position of the iron in the tube, to give a maximum indication, this assembly will assure a better indication of the presence of magnetic metal in the tube, as the magnetic metal passes through, assuming that it does not change its angular position during its passage. However, if the magnetic metal is having a movement of angular displacement, as well as a lateral displacement through the tube, then the indication will be all the better, upon the principles mentioned with respect to Fig. 8.

Referring to Fig. 14, this is a modification showing a tubular conveyor 380, which is provided with three exemplary magnet-coil assemblies 381, 382, 383. In every case these magnets may consist of "Alnico" permanent magnets, and the coils may consist of a multiplicity of insulated turns of wire arranged in a pancake coil about the end of the magnet pole.

The conveyor 380 is, of course, of non-magnetic or other material.

The magnet-coil assembly 381 is best adapted to indicate the presence of small slivers of magnetic metal when in the position of the iron particle 384. Similarly, the assembly 382 indicates best iron particles in the position 385, and the assembly 383 indicates best iron particles in the position 386.

In order to make sure that these positions are accurately depicted, the position of the iron sliver 384 is axial of the tube 380, that of 385 is transverse to the axis of tube 380, in a horizontal plane, and that of 386 is transverse to the axis of tube 380 in a vertical plane.

These magnet-coil assemblies, as well as those discussed with respect to Figs. 11–13, all have their coils identical in structure and oppositely connected so as to balance out outside magnetic effects, and any number of magnet-coil assemblies may be used to increase the strength of the magnetic field and provide a suitable magnetic field in a conveyor or conduit of any size.

The combination of the magnet-coil assemblies in these different positions assures a maximum indication for the presence of slivers of magnetic metal in any position, as they move through the tube. As the coils are never energized, it is only the movement of the magnetic metal which is detected in any instance.

Figure 4:
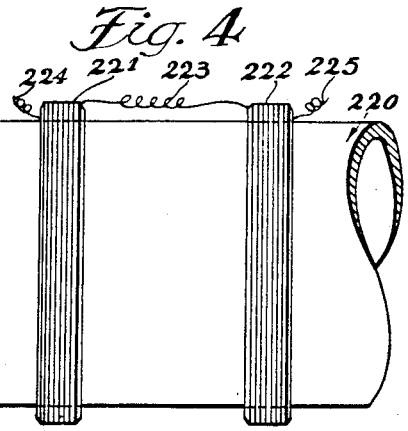
Fig. 4 is a vertical elevational view of a tubular or conduit arrangement, for the purpose of detecting the presence of magnetic metal by its movement in the conduit surrounded by the coils.

Referring to Fig. 4, this is another modification in which there is provided a tubular conduit 220 of non-magnetic material. The size of this conduit may vary from a few inches to a few feet in diameter. It may be used for carrying liquid or granular materials, or it may be of suitable size so that packages may be passed through the conduit. The granular materials or packages may contain particles of electromagnetic metal or large bodies.

Located about the conduit are the coils 221, 222, similar in electrical characteristics, but spaced from each other. The outermost turns are connected by the conductor 223, and the innermost turns connected to leads 224, 225. Thus it will be observed that the coils are connected so as to oppose each other.

When a body of magnetic material, such as iron, steel, nickel, or cobalt, or suitable alloys, passes through the conduit 220, there is an electromotive force generated in the coils 221, 222. This electromotive force is produced in spite of the absence of the permanent magnets, which are shown in the other embodiments, because every body of paramagnetic material has at least a slight amount of residual magnetism. All such bodies are, therefore, magnetized, at least in a small degree.

Figure 5:
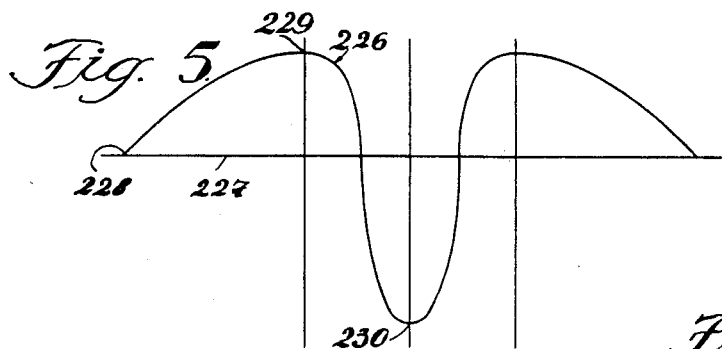
Fig. 5 is a curve illustrating the electrical impulse resutling from the use of the coils of Fig. 4.

Referring to Fig. 5, the curve 226 drawn with respect to the base line 227 indicates the magnitude and direction of the electromotive force generated. As the body comes into the range of the coil 221, the electromotive force increases from the point 228 to a maximum at the point 229, where the average location of the body is in the middle of the coil 221. Thereafter the magnetic body in the conduit 220 is passing out of the coil 221, while it is passing into the range of the coil 222.

The coils 221, 222 are closer to each other than the distance from the point 228 to the point 229 in a horizontal direction. The movement of the body out of the coil 221 produces an electromotive force in the opposite direction, which is indicated by a drooping portion of the curve from the point 229. This is additive to the effect produced by its motion toward the coil 222, since the coils are oppositely connected, and therefore the electromotive force reaches a maximum in the opposite direction at the point 230. The rest of the curve, which is produced as the body passes on through the coil 222, is similar in shape and symmetrical with respect to the curve so far described.

It will thus be observed that by connecting these coils oppositely an additive effect is secured, producing an alternating impulse for each paramagnetic body which passes through the conduit 220.

It will thus be observed that I have invented an improved metal detection system and a multiplicity of industrial and other applications of metal detection units of improved characteristics.

My metal detection system is characterized by a lack of heating of the coils, since there is no energy needed for the coil system, and by low power consumption, since power is only required for the amplifier where an amplifier is used. The system is balanced against stray field disturbances and is unaffected by the presence of metals not in motion. There are no currents or voltages to be balanced, and therefore no need for constant readjustment to preserve the balance. It is characterized by a stationary balance rather than a dynamic balance of currents or voltages.

So far as I am aware, prior to my invention there were no metal detection devices which were capable of eliminating the disturbances caused by static charges, distortion of the earth's magnetic field by heavy moving metal bodies, and electromagnetic waves sent out by D. C. machinery. The electromagnetic waves, for example, sent out by the starting or change of energization of a street car motor produced such electrical impulses in the prior art devices that false signals were caused and effective detection was impossible. Such a disturbance might be felt over a distance of half a mile.

It should be noted that where the coils of my system are stationary the device is primarily adapted for the detection of ferrous metals; where the coils are arranged for rotation the devices are adapted for the detection of the presence of any metal due to the action of eddy currents.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a metal detector unit, the combination of a non-magnetic tubular member with a tubular permanent magnet surrounding the same, said tubular permanent magnet being provided with pole pieces extending from the ends of said tubular permanent magnet into engagement with the sides of said non-magnetic tubular member, said non-magnetic tubular member having its conduit eccentrically disposed with respect to the permanent magnet, and a plurality of coils of wire about said non-magnetic tubular member, for induction of current in said coils upon passage of a particle of magnetic metal through the non-magnetic tubular member.

2. In a metal detector unit, the combination of a tubular permanent magnet with a non-magnetic tubular member, and pole pieces of magnetic material carried by said non-magnetic tubular member for engaging said permanent magnet to form a housing, a plurality of insulated turns of wire about said non-magnetic tubular member in said housing, said non-magnetic tubular member having an obstruction therein for causing a lateral displacement of a magnetic metal particle passing through said non-magnetic tubular member.

3. In a metal detector unit, the combination of a tubular permanent magnet with a non-magnetic tubular member, and pole pieces of magnetic material carried by said non-magnetic tubular member for engaging said permanent magnet to form a housing, a plurality of insulated turns of wire about said non-magnetic tubular member in said housing, said non-magnetic tubular member having an obliquely extending partition for causing a lateral displacement of particles of magnetic metal passing through said latter metal member, to give a better indication of the presence of magnetic metal.

4. In a metal detector of high sensitivity, the combination of tubular means of nonmagnetic material for guiding a subject to be tested, a plurality of insulated coils of wire extending about said tubular means, permanent magnet means disposed adjacent said tubular means so that lines of flux pass through said tubular means and through said coils, and means for orienting the permanent magnet means and coils with respect to the subject-matter to be tested, whereby there is a relative movement between the subject-matter to be tested and the coils of wire causing a change in the lines of flux which cut the coils and produce an electromotive force, irrespective of the position or direction of the major axis of the material to be tested as it passes through said tube.

VICTOR W. BREITENSTEIN.